Jan. 20, 1970   OLE-BENDT RASMUSSEN   3,491,185
METHOD AND APPARATUS FOR ORIENTING FILMS
MADE FROM THERMOPLASTIC POLYMERS
Filed April 28, 1966

3,491,185
METHOD AND APPARATUS FOR ORIENTING
FILMS MADE FROM THERMOPLASTIC
POLYMERS
Ole-Bendt Rasmussen, 28 Rugmarken,
Farum, Denmark
Filed Apr. 28, 1966, Ser. No. 546,041
Claims priority, application Great Britain, May 5, 1965,
19,056/65
Int. Cl. B29c *17/02;* B29d *7/24*
U.S. Cl. 264—288                4 Claims

ABSTRACT OF THE DISCLOSURE

A high degree of molecular orientation in a single direction is produced in organic thermoplastic polymer films by stretching the heated film less than about 75% of the length at which maximum orientation is attained, subsequently producing fine longitudinal folds in the film to reduce its width in excess of the width reduction resulting from stretching it to maximum orientation in the non-folded state, and finally stretching the film to approximately maximum orientation with simultaneous compression of the longitudinal folds, the final stretching being performed at a temperature within or slightly below the melting range of the polymer.

---

Figure 1:
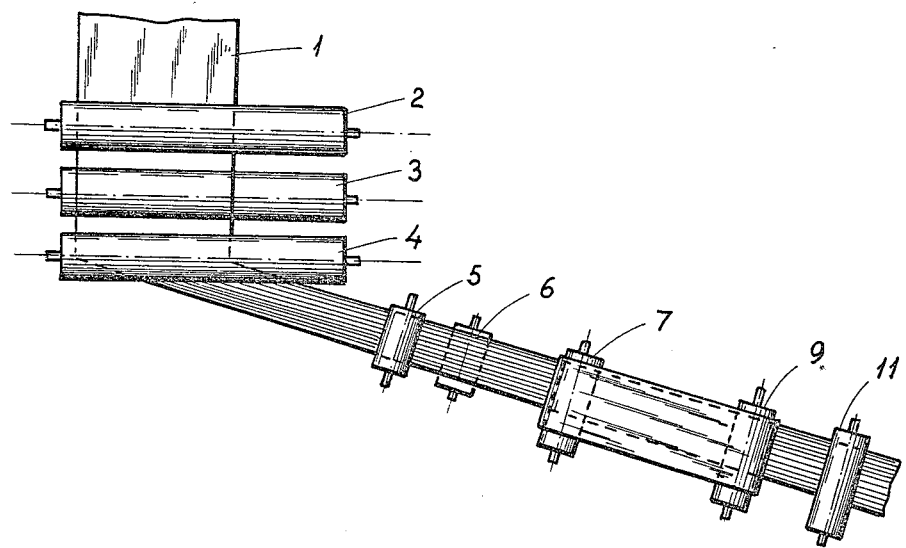

This invention relates to a method and an apparatus for producing a high degree of molecular orientation in a single direction in films made from organic thermoplastic polymers by stretching the films at an increased temperature.

In recent years, uniaxially oriented films, particularly the rather cheap and strong films, which can be made from isotactic or syndiotactic polypropylene, or from high density polyethylene, have been widely used for twines, ropes and—in partly fiberized state—for different kinds of technical yarns. In view of the great demands for products of this kind, and of the hard competition in prices, a need exists for a safer stretching method, allowing for the use of second grade qualities of the starting material without substantial risk of ruptures in the film during the stretching of the latter to obtain substantially maximal molecular orientation.

It is the object of the present invention to provide for a method satisfying the said need.

With this object in view, the present method is characterized in that the heated film is longitudinally stretched to not more than 75% of the stretching to $n$ time the original length, which is necessary to obtain maximal orientation, the said initial stretching being carried out in connection with, or being followed by a reduction of width of the film which is greater than the reduction $1:\sqrt{n}$ which takes place on account of the stretching, the said reduction being accomplished by producing fine longitudinal folds in the film, after which the film is stretched to a degree of orientation at or in the neighbourhood of the maximal one with simultaneous compression of the longitudinal folds, the said final stretching being performed at a temperature in or slightly below the melting range of the polymer.

As a result of accomplishing the orientation by stretching in several steps, a number of advantages are gained since it should be noted that in order to obtain maximal orientation of for instance high density polyethylene, or isotactic or syndiotactic polypropylene, a stretching of the film to about ten times the original length will usually be necessary. During the stretching, if no lateral forces are created, the film will be contracted in width at about the same ratio as its thickness is reduced and, since the volume of the film is substantially unchanged, this means that its thickness as well as its width will be reduced in the ratio $1:\sqrt{n}$, if the film is stretched $n$ times.

The risk of ruptures increases with the stretching ratio and is rather minimal during the first part of the total stretching, so that generally no special precautions are necessary during this part of the stretching procedure in order to avoid ruptures. However, longitudinal folds may be established already during this preliminary stretching in order to totally eliminate the risk for ruptures, even when very bad qualities of films are used.

On the other hand, the risk for ruptures strongly increases during the latter part of the stretching procedure, and it is, therefore, of the greatest importance for avoiding ruptures that during this final stretching counter-measures are set in, consisting of the said longitudinal folding in connection with the compression.

It is known per se to impart a longitudinal pleating to a film, which is to be oriented by stretching, to such an extent that the width of the pleated film corresponds to the width of the flat film after stretching. This, however, has proved insufficient when second grade qualities of thermoplastic films are to be stretched maximally, and accordingly it is a characteristic feature of the present method that the film is provided with very fine longitudinal folds to such an extent that the width of the film is reduced more than corresponding to the contraction which is due to the stretching, which also makes it possible to simultaneously subject the film to a compression in connection with the final stretching, the latter being carried out by a temperature at or slightly below the melting range of the polymer.

It has surprisingly been found that the tendency for ruptures across the film is thus substantially eliminated, while the tendency for ruptures extending in the longitudinal direction are somewhat reduced. Ruptures of the latter kind, however, are relatively harmless, particularly if the oriented material is destined for later splitting into a fibrous product. Thus the present method represents a substantial technical step forward in this field, because even rather inhomogeneous film material can be used.

Normally, every inhomogeneity in the film material will increase the risk for ruptures, and such inhomogeneities, which may be in the form for example, of thinner areas, cavities, or an inhomogeneous distribution of larger and smaller molecules in the mixture of molecules of which each polymer consists, are particularly pronounced in the second grade qualities of films, the use of which is specifically aimed at in the present method. The inhomogeneities cause the film to be more easily stretchable in the thinner areas and in places with cavities, because of the increased tensile force per unit of the cross section due to the reduction of the latter by the said inhomogeneities. The film also becomes more easily stretchable in parts where smaller molecules dominate in the composition of the material, because such smaller molecules do not offer the same resistance to stretching as do the bigger ones.

The reason why the tendency for ruptures is eliminated or reduced by applying the present method, probably is that the compression, which is carried out in connection with the final stretching, prevents or counteracts the lateral stretching forces which are created by inhomogeneous stretching when the individual longitudinal folds are flattened out, whereby the material, which assumes a plastic state due to the heating in connection with the compression, tries to migrate to the sides but is prevented therein by material from the neighbouring folds so that the final result is a compression and flattening of the folded film. The latter thus increases in thickness which to some extent counteracts the reduction in thickness normally produced by the stretching, and at the same time flowing of the material results in material from the surroundings migrating towards the place where the biggest stretching takes place, the migrating material replacing the material removed by the stretching.

The best results are achieved when the longitudinal folding is finer, and in a preferred embodiment of the present method, therefore, wavy longitudinal folds are produced to reduce the width of the film, the height of said folds not substantially surpassing 2–4 times the film thickness.

The longitudinal folds may be produced in various manners, i.e. by means of two sets of intercombing rotating discs, each set of which is mounted upon a common shaft, but preferably the longitudinal folds are produced in connection with the first stretching step by accomplishing the latter by means of two sets of rollers, the axes of which intersect one another at an angle of 70°–85°.

As formerly stated, the invention also comprises an apparatus for carrying out the present method, said apparatus comprising, taken in the machine direction, means for heating the films, and two sets of rollers for producing the initial stretching, the axes of said rollers intersecting one another at an angle of 70°–85°, and finally parallel to the latter of the said sets of rollers a further set of rollers for producing the final stretching.

To get better control with the film temperature, a preferred embodiment of the present apparatus further comprises means for heating the film during the initial stretching. The said means may for example consist of heater rollers, or preferably of an oven surrounding the film on all or part of the length where the initial stretching takes place.

A further embodiment of the present apparatus is characterized in the rollers in the latter set of rollers for the initial stretching serving as driving rollers for endless belts of a heat resistant rubber, each of said belts partly surrounding one of the said rollers and being adapted to be driven in such manner that a stretching of the belts takes place in the zone where they are in contact with the film. The high co-efficient of friction of the surfaces of such rubber belts assists in maintaining the longitudinal folds in the shape, in which they are formed, and thus in ensuring uniform compression and stretching of the film material.

Figure 2:
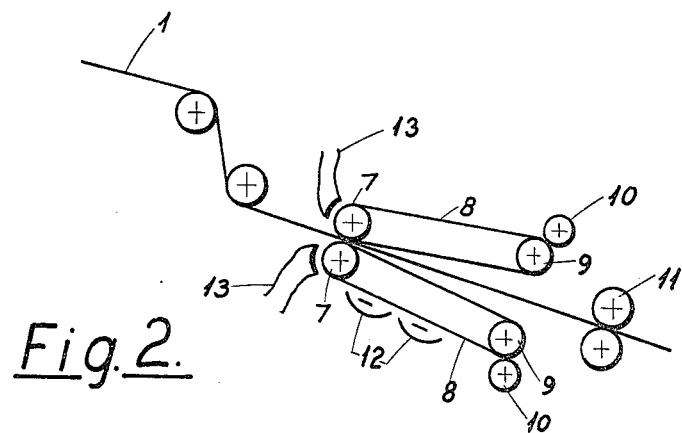

The method and the apparatus of the present invention will be described in further details in the following with reference to the accompanying drawings of an embodiment of the apparatus, wherein FIG. 1 schematically shows a plan view of the apparatus and FIG. 2 also schematically shows a cross section of that part of the apparatus where the final stretching of the film takes place.

A film 1 is preheated by passage under a heated roller 2 and over another heated roller 3, both of which are provided with not shown means for control of the temperature, and both of which are driven in order to prevent uncontrolled stretching of the film.

Preferably, the film is preheated to a temperature at or slightly below the melting range of the film material, after which the film passes to a set of rollers 4, said rollers being kept pressed against one another and at least one of the rollers preferably being coated with a heat resistant rubber, for example a nitrile rubber. Both of the said rollers are provided with means (not shown) for heating and for temperature control, and both are preferably driven.

From the said rollers 4, the film is passed under a roller 5 at an angle of 70–85° to the original longitudinal direction, and then over a roller 6 to a set of rollers 7 being adapted to be driven at a greater peripheral speed than the set of rollers 4. Thus the rollers 7 together with the rollers 4 constitute the means for carrying out the initial stretching of the film and also for producing the fine longitudinal folding of the film by the oblique taking off from the set of rollers 4.

The rollers 5 and 6 are provided with (not shown) means for heating and for controlling the temperature, and they serve to keep the film heated. They may be exchanged for an oven through which the film is led.

In the embodiment of the drawings, endless rubber belts 8 are supported by the rollers 7, said belts being driven by means of two sets of rollers, each consisting of rollers 9 and 10, at a peripheral speed and with a compression which causes the two belts to be in a stretched state at their zone of contact in the nip of the said rollers 7. The rollers in the said set of rollers 7 can be pressed against one another by an adjustable pressure and are thus able to impart a compression to the folded film to such an extent that a flattening of the folds occurs by flowing of the film material, which is plastic in the heated state.

The final stretching of the film to obtain a degree of orientation at or slightly below the maximal one is produced by carrying the film through a set of rollers 11 cooperating with the set of rollers 7 and being driven at the necessary higher peripheral speed.

The rubber belts 8 should be sufficiently elastic and heat resistant. They may be made for example of nitrile rubber. To heat the belts, heaters 12 with temperature control means 13 are provided.

If the rollers 7 are made with a perfectly even surface, the rubber belts 8 may be omitted.

The rollers coming into contact with the hot film may be coated for example with silicone, if necessary, in order to prevent the film from adhering to the roller surfaces.

The following example serves to further illustrate the utility of the present method.

A substantially unoriented film of a thickness of 80μ and a width of 500 mm. is produced by extruding isotactic polypropylene, having a melt index of 0.2 as determined according to ASTM D–1238–62T, condition L. Laboratory tests on narrow ribbons cut in the longitudinal direction of the film show that the maximum tensile strength is obtained by stretching at 135° at a ratio not exceeding 9.5:1. If the ribbons are provided with pin point holes, however, rupture will occur at a stretching ratio of about 7:1.

If the ribbons with pin point holes are stretched according to the present method at a temperature at 135° C. in both stretching zones, and the film direction is changed at an angle of 80°, the initial stretching may be carried out in a ratio of 6:1 and the final stretching in a ratio of 1.5:1, i.e. a total stretching ratio of 9:1, without ruptures occurring.

I claim:

1. Method for producing a high degree of molecular orientation in a single direction in stretchable films made from organic thermoplastic polymers by stretching the films at an elevated temperature, comprising initially stretching heated film longitudinally to a length not surpassing 75% of that necessary to produce maximum possible orientation; longitudinally folding the initially stretched film to produce a multitude of fine longitudinal folds and to reduce the width of the film in excess of the reduction in width obtainable by stretching the film to get maximum orientation; and then stretching the longitudinally folded film to about maximum orientation with simultaneous compression of the longitudinal folds, said final stretching being performed at a temperature about the melting point range of the polymer.

2. Method according to claim 1, characterized in that the reduction in width of the initially stretched film is accomplished by folding the film to produce wavy longitudinal folds, the height of which do not substantially surpass two to four times the thickness of the film.

3. Method according to claim 1, characterized in that the longitudinal folds are produced in connection with the initial stretching by accomplishing the latter by means of two sets of rollers, the axes of which intersect at an angle of 70–85°.

4. Method according to claim 1 wherein the organic thermoplastic polymers are second grade quality polymers selected from the group consisting of high density polyethylene, isotactic polypropylene, and syndiotactic polypropylene.

References Cited

UNITED STATES PATENTS

| | | | |
|---|---|---|---|
| 3,003,304 | 10/1961 | Rasmussen | 57—157 |
| 3,398,220 | 8/1968 | Port et al. | 264—147 |
| 2,494,334 | 1/1950 | Dorst. | |
| 2,505,146 | 4/1950 | Ryan | 264—289 |
| 2,547,736 | 4/1951 | Blake | 264—288 |
| 2,943,356 | 7/1960 | Rasmussen. | |
| 3,165,563 | 1/1965 | Rasmussen | 264—288 X |
| 3,233,029 | 2/1966 | Rasmussen | 264—288 |
| 3,235,644 | 2/1966 | Rasmussen | 264—288 |
| 3,257,488 | 6/1966 | Rasmussen | 264—288 |
| 3,296,351 | 1/1967 | Rasmussen | 264—289 |
| 3,350,491 | 10/1967 | Rasmussen | 264—288 |
| 3,354,253 | 11/1967 | Rasmussen | 264—288 |
| 3,370,111 | 2/1968 | Boone | 264—289 X |

FOREIGN PATENTS 46,301   12/1962   Poland.

JULIUS FROME, Primary Examiner

J. H. WOO, Assistant Examiner

U.S. Cl. X.R

264—147, 287